June 29, 1954  R. V. KELLY  2,682,436
PISTON RING
Filed Oct. 5, 1953
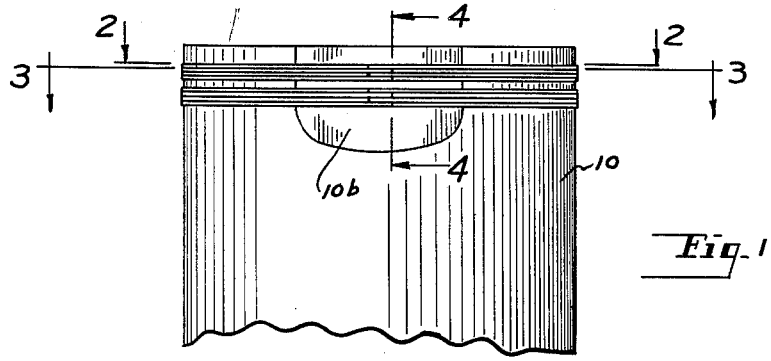
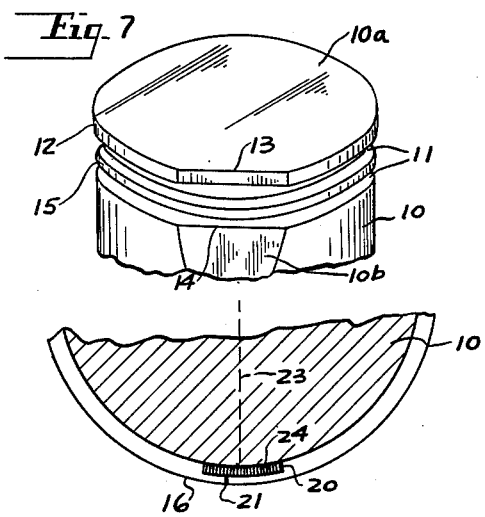
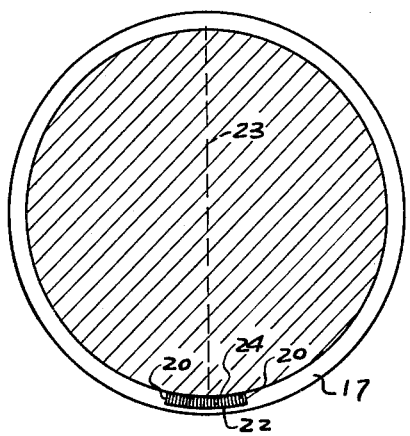
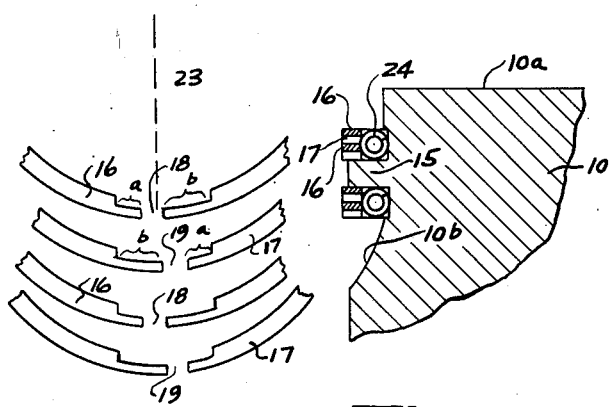
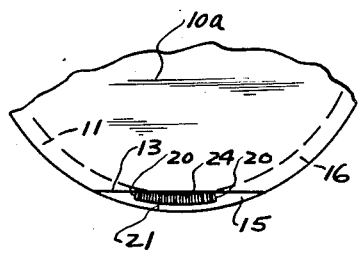
INVENTOR.
RALPH V. KELLY.
BY Louis Chayka
ATTORNEY.

Patented June 29, 1954

2,682,436

UNITED STATES PATENT OFFICE 2,682,436

PISTON RING

Ralph V. Kelly, Detroit, Mich.

Application October 5, 1953, Serial No. 384,279

3 Claims. (Cl. 309—47)

My invention pertains to piston or packing rings used on the reciprocating pistons in the cylinders of the internal combustion engines. The rings are of a type in which the ends of the ring are normally spaced by a gap. My improvement calls for the use of a plurality of such rings in a specific arrangement. Specifically, the object of my improvement is to provide a plurality of rings to be employed upon the piston as a set, the relative positions of the rings in a set being such that the gap between the ends of one ring will be out of alinement with the gaps of the adjoining rings.

A further object of my improvement is to employ the rings of the set in combination with a coiled spring, both for the purpose of aiding in the radial expansion of the rings during their operative use and for the purpose of preserving the above-named arrangement of the rings whereby the gaps of the rings will be staggered with respect to each other.

I shall now describe my improvement with reference to the accompanying drawings in which:

Fig. 1 is a side elevational view of the upper portion of a piston with two sets of rings embodying inventive features above referred to;

Fig. 2 is a sectional view on line 2—2 of Fig. 1;

Fig. 3 is a sectional view on line 3—3 of Fig. 1;

Fig. 4 is a sectional view on line 4—4 of Fig. 4;

Fig. 5 is a partly diagrammatic view disclosing gap including portions of individual piston rings;

Fig. 6 is a fragmentary view in top elevation of the top surface of a piston ring, the view disclosing a coiled spring used in combination with a set of rings;

Fig. 7 is a perspective view of the top portion of a piston modified for use with my piston rings.

Similar numerals refer to similar parts throughout the several views.

Piston 10 is provided with conventional annular grooves 11 into which the packing rings, commonly designated as piston rings, are adapted to fit. As the result of the formation of the grooves, the top portion of the piston includes a flange 12. It will be noted that a part of the flange is cut off along a straight line 13, this being the line of a chord of the circle defining the top surface 10a of said piston. A similar straight line 14 will be observed below the lower groove 11. Numeral 15 indicates a flange separating the two grooves.

According to the prevailing practice, a plurality of rings fit into one groove, the bottom surface of one resting on the top surface of the ring immediately therebelow. The drawing in Fig. 1 shows four rings forming a set, which set fits into one annular groove 11. While all the rings in a set are of the same general dimensions regarding their individual diameters and thickness, and while each is provided with a gap, the gaps are so arranged, when the rings are assembled into a set, that said gaps are in a staggered relation to each other, or, at least, that the gap of one ring is in a staggered relation to the gaps of the adjoining rings. This is shown in Fig. 5 where the rings are marked consecutively, beginning at the top, 16, 17, 16, and 17, while the gaps are marked in similar order, 18, 19, 18, and 19.

The end portions of each ring are of a reduced width along an arcuate length of each respective end portion from a radially-disposed shoulder to the gap. The shoulders are all marked 20, but the distance of one shoulder from the gap on one end of the ring is different from such a distance on the other end of the same ring. What is more, the distances on one ring are reversed with respect to the distances on the adjoining ring, as best shown in Fig. 5. A dotted straight line 23 represents the diameter common to all the rings. The distances from shoulders 20 to the gap are marked "a" and "b" in the top ring 16. In the next ring they are reversed, "b" and "a." However, the distance between two shoulders of any ring is equal to the distance between the two shoulders of any other ring in the set.

As is well known, the gaps appear in the rings when they are in their fully or partly expanded positions. When compressed by contact with the walls of the respective cylinders, the gaps may be materially reduced or they may disappear entirely, but the lines of contact of the ends in one ring will be out of register with a similar line in the adjoining ring. This is shown in Figs. 2 and 3 where the line of contact in ring 16 is marked 21, and the line of contact in ring 17 is marked 22. The positions of the lines in Figs. 2 and 3 may be considered with relation to said line 23 which indicates the diameter of the rings.

When all the rings of a set are in their respective groove, the spaces between shoulders 20 in all the rings are to be in register, that is, the shoulders of all the rings on one side of the diameter are to be alined with each other, and similarly, such an alinement will be had on the other side of the diameter. Fitting between the shoulders of all the rings is a single coiled spring 24. The spring, bearing at its ends against the shoulders of all the rings, keeps them in place, preventing a rotary shift of individual rings and any disarrangement of the staggered relation of the gaps or the lines of contact as defined above.

After having described my improvement, what I wish to claim is as follows:

1. A set of flat piston rings to fit into a single annular groove of a piston of an internal combustion engine, each ring having two ends normally spaced by a gap, each end, as seen from above, being of a reduced width along a length thereof beginning at a radial shoulder spaced from the gap to said gap, the length of the reduced portion on one end being different from that of the other end, the distances between the shoulders of all the individual rings being the same, but the position of the gaps in the individual rings being staggered with relation to the adjoining rings, and a coiled spring fitting between the shoulders of all the rings, the ends of the coiled spring bearing against said shoulders to expand said rings diametrically.

2. A set of packing rings for a piston of the internal combustion engine, each ring having normally a gap between its ends, each end being provided on its inner side with a recess extending from the gap to a radial shoulder spaced from said gap, the distance of the shoulders from each other being the same in all the rings, but the location of the gaps between respective rings being staggered with respect to the adjoining rings, and a single coiled spring fitting between the shoulders of all the rings of the set and bearing at its opposite ends against said shoulders to expand the ring radially.

3. A set of packing rings adapted to fit into a single groove of a piston in an internal combustion engine, each ring having normally a gap between its ends, each end being provided on its inner side with a recess extending from the gap to a radial shoulder spaced from said gap, the distance of the shoulders from each other being the same in all the rings, but the location of the gaps between respective rings being staggered with respect to the adjoining rings, and a single coiled spring fitting between the shoulders of all the rings of the set and bearing at its opposite ends against said shoulders to expand the ring radially, a portion of the piston adjoining the groove being cut off on a line of a chord to its circumference for insertion of the spring into the space between said shoulders.

References Cited in the file of this patent

UNITED STATES PATENTS

| Number | Name | Date |
| --- | --- | --- |
| 1,064,269 | White | June 10, 1913 |
| 2,058,420 | Deegan | Oct. 27, 1936 |
| 2,107,301 | Koether | Feb. 8, 1938 |